April 7, 1953  H. V. BANNISTER  2,633,687
STALK CUTTER AND SHREDDER
Filed Jan. 26, 1951  5 Sheets-Sheet 1

INVENTOR
Harold V. Bannister
BY Shoemaker & Mattare
ATTORNEYS

April 7, 1953 H. V. BANNISTER 2,633,687
STALK CUTTER AND SHREDDER
Filed Jan. 26, 1951 5 Sheets-Sheet 4

INVENTOR
Harold V. Bannister
BY Shoemaker & Mattare
ATTORNEYS

April 7, 1953 — H. V. BANNISTER — 2,633,687
STALK CUTTER AND SHREDDER
Filed Jan. 26, 1951 — 5 Sheets-Sheet 5
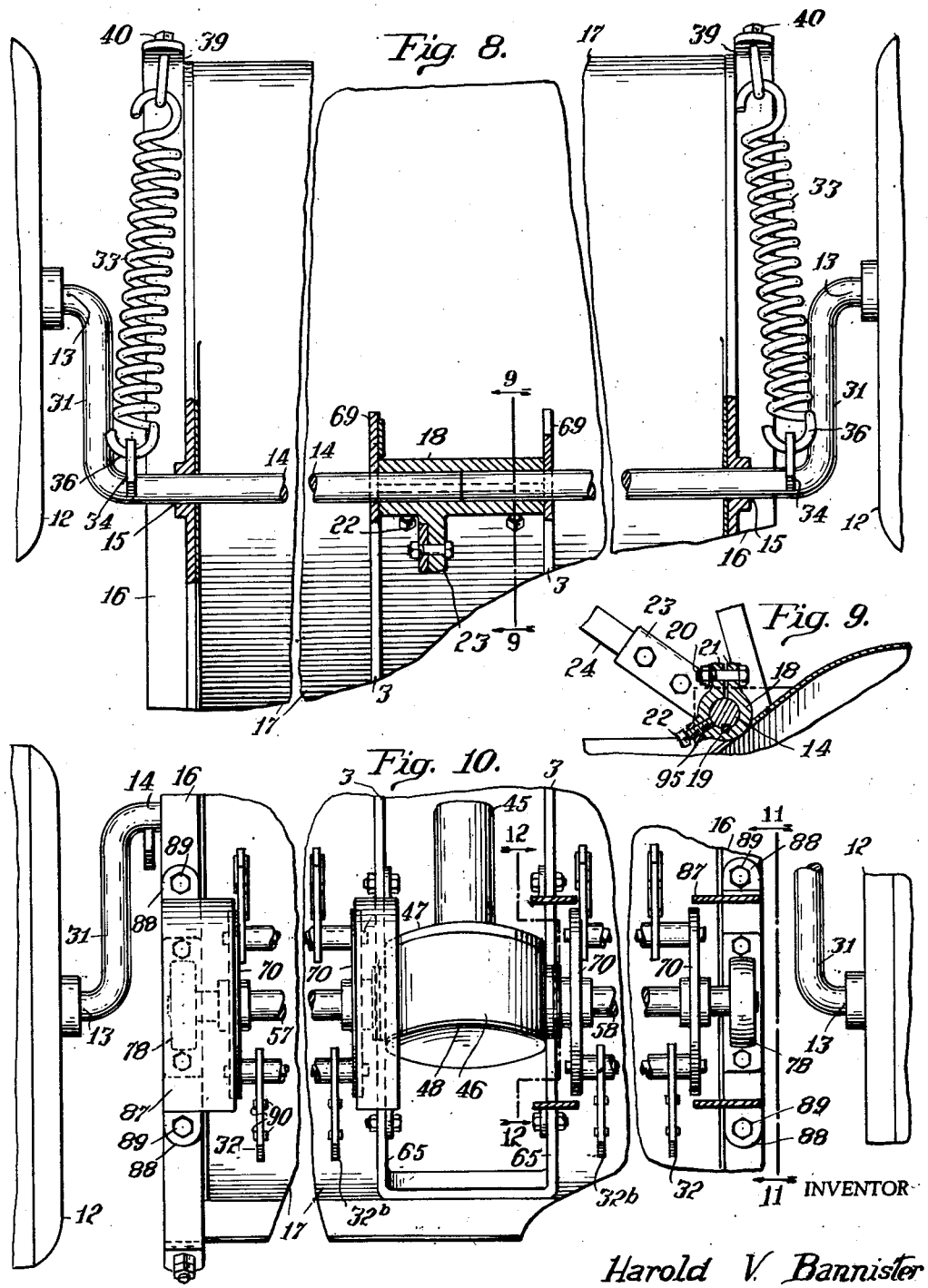
INVENTOR
Harold V. Bannister
BY Shoemaker & Mattare
ATTORNEYS Patented Apr. 7, 1953

2,633,687

UNITED STATES PATENT OFFICE 2,633,687

STALK CUTTER AND SHREDDER

Harold V. Bannister, Waverly, Iowa, assignor, by mesne assignments, to Continental Belton Company, Belton, Tex., a corporation of Texas Application January 26, 1951, Serial No. 208,040

5 Claims. (Cl. 55—118)

The invention relates to a stalk cutter and shredder.

An object of the present invention is to provide a stalk cutter and shredder of simple and comparatively inexpensive construction which will be easy to build and at the same time provide a simple means for driving at high speed cutting and shredding hammer cylinders from a power take-off on a tractor of the agricultural type or other towing vehicle.

A further object of the invention is to provide a cutting and shredding machine of this character adapted to cut, shred and practically pulverize standing or down crop stalks and other vegetation in the field.

Various crops, such as corn, beans, cotton, etc., are either picked leaving the whole stalk standing or partially standing in the field, or are cut leaving a portion of the stalk standing and scattering the remainder on the ground surface. To facilitate clean plowing and to lessen the crop menace from such insects as corn borers, the present invention provides simple and effective means for cutting, shredding and pulverizing both standing stalks and those cut off and lying on the ground surface.

A further object of the invention is to provide a simple means for height adjustment so that the cutting hammers may be set at the proper height above the ground surface to obtain the best cutting, shredding and pulverizing action.

A further object of the invention is to provide a machine having means for eliminating the necessity of providing guiding points or shoes to bring the stalks into proper alignment with the machine cutting hammers.

A further object of the invention is to provide simple means for supporting the cutting hammer cylinders on a shaft with simple bearing means for the shaft.

Another object of the invention is to provide simple means for adjusting the distance between the stalk cutter and shredder and the draw bar of the towing vehicle so that the proper relationship with the power take-off shaft may be attained for easy turning of the machine.

Another object of the invention is to provide a corn cutter and shredding machine equipped with rotating high speed cutting hammers arranged to cut and pick up stalks and other vegetation and adapted to continue operating on stalks until they are reduced to a shredded or pulverized condition.

It is also an object of the invention to provide a stalk cutting and shredding machine having a guard arranged to prevent stones or other heavy objects picked up by the cutting hammers from striking the operator of the tractor or other towing vehicle.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 6 is a vertical longitudinal sectional view taken on the line 6—6 of Fig. 4;

Fig. 7 is a detail perspective view of one of the cutting hammers;

Fig. 8 is a plan view partly in section illustrating the manner of mounting the crank axle;

Fig. 9 is a detail sectional view taken on the line 9—9 of Fig. 8;

Fig. 10 is an enlarged bottom plan view of the rear portion of the stalk cutter and shredder;

Fig. 11 is a detail elevation taken on the line 11—11 of Fig. 10 illustrating the arrangement of the end guards for the hammer cylinders;

Fig. 12 is a detail sectional view taken on the line 12—12 of Fig. 10.

Figure 1:
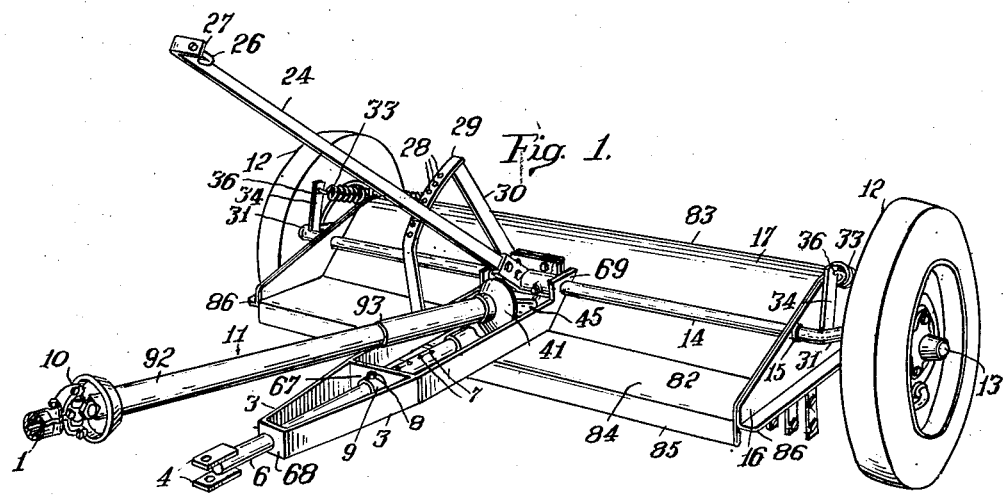
Fig. 1 is a perspective view of a stalk cutter and shredder constructed in accordance with the present invention.
Figure 2:
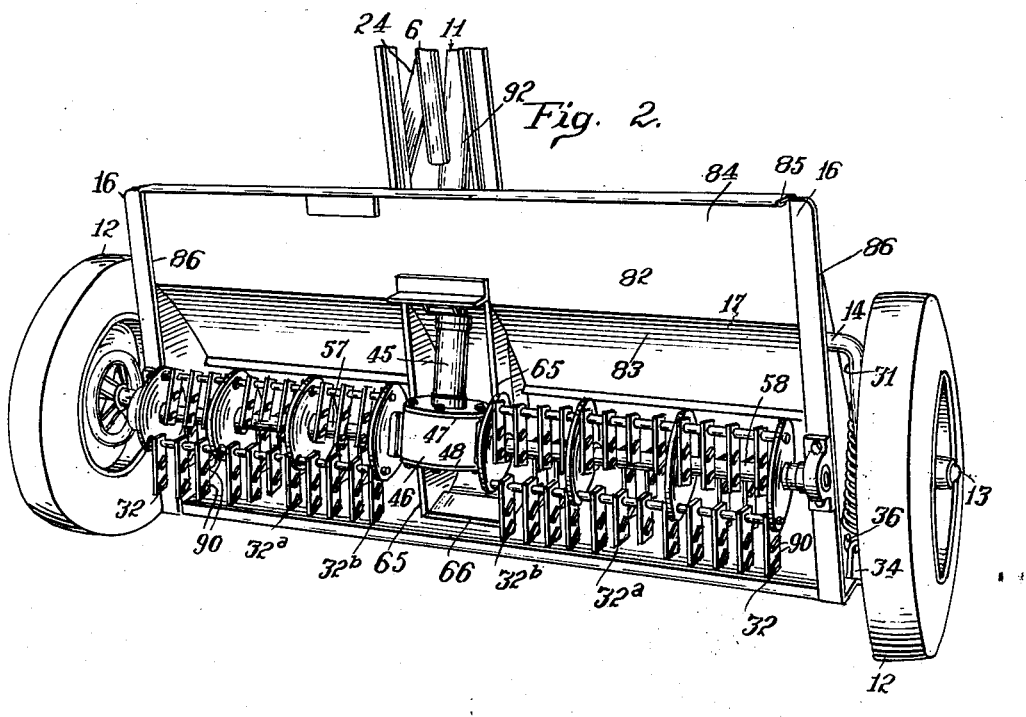
Fig. 2 is a similar view looking at the bottom of the machine.
Figure 3:
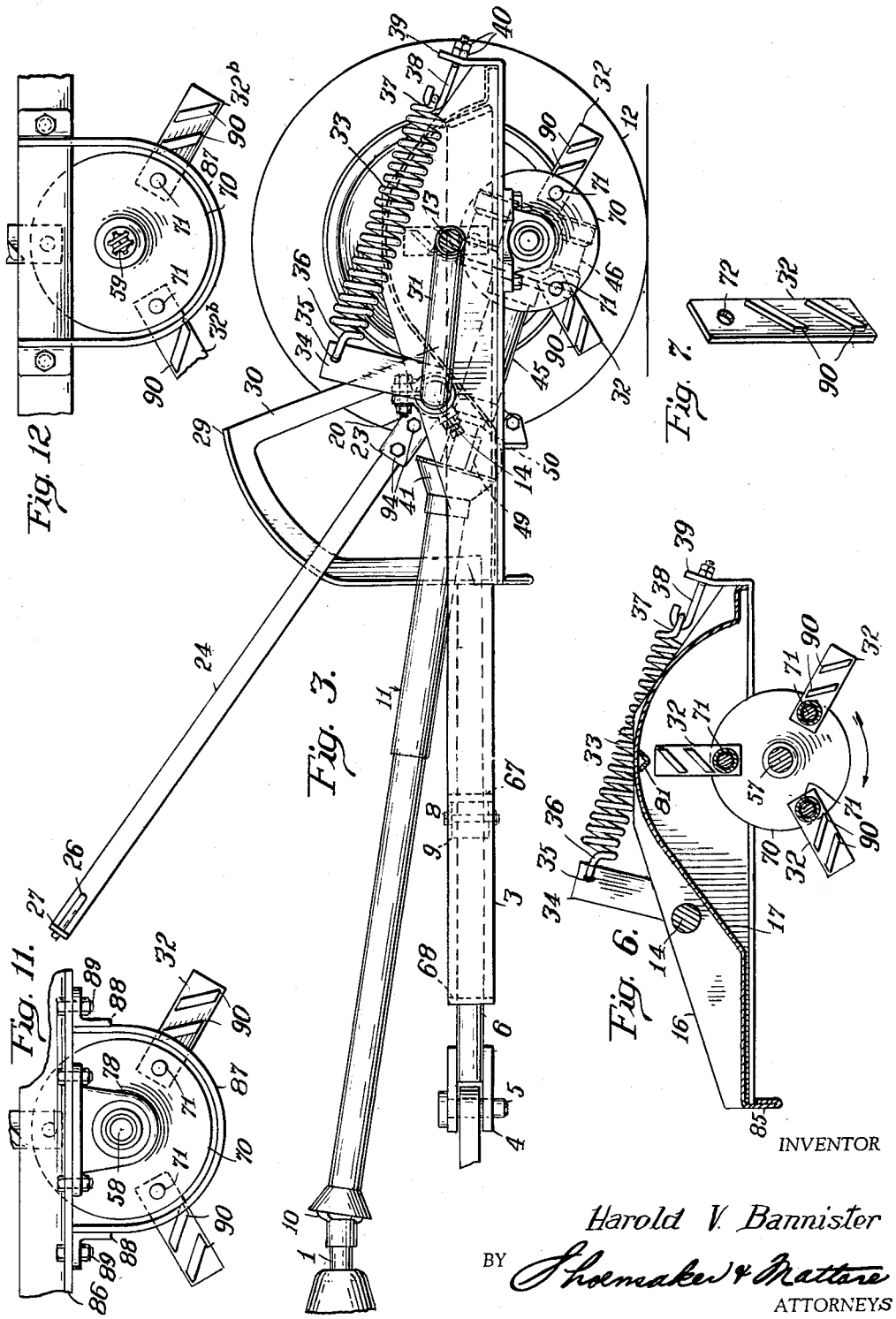
Fig. 3 is a side elevation of the stalk cutter and shredder.

In the accompanying drawings, in which is illustrated the preferred embodiment of the invention, the stalk cutter and shredder is connected with the rear power take-off drive extension 1 and the draw bar 2 of a tractor, preferably of the agricultural type, but any other suitable motor actuated vehicle or machine may, of course, be employed for towing purposes.

The stalk cutter and shredder is supported at the tractor end and is pulled through the field by means of the tongue 3 which is provided at the front end with a suitable clevis 4 receiving the draw bar 2 and secured to the same by a coupling pin 5 which passes through openings in the clevis and the draw bar. The clevis may be of any desired construction and may consist of spaced upper and lower plates welded or otherwise secured to the front end of an adjustable bar 6 slidably mounted in the tongue 3 and provided with a plurality of spaced holes 7 adapted to be engaged by a bolt 8 for adjustably securing the bar 6 to the tongue 3. The bolt 8 is mounted in a collar 9 which forms a guide for the adjustable bar or reach rod 6. The several holes 7 provide for enabling the universal joint 10 of the power take-off 11 to be centered over the coupling pin 5 as nearly as possible. This provides the best arrangement for wear and oscillation of said power take-off assembly 10.

The stalk cutter and shredder is supported at the rear end on wheels 12 which are mounted on spindles 13 of a crank axle 14 which passes through transversely aligned openings 15 in end plates 16 of a hood 17 which constitutes the main frame of the machine. The crank axle 14 is composed of two sections which have their inner adjacent ends arranged in and rigidly connected together by a coupling 18 consisting of a split sleeve splined to the axle sections at 19 and clamped thereon by bolts 20 which pass through ears 21 of the split portion of the coupling sleeve. Also the sections of the axle are engaged by clamping screws 22 threaded into the coupling sleeve 18 and engaging at their inner ends the axle, as clearly illustrated in Fig. 9 of the drawings.

The coupling sleeve of the axle is provided with an arm 23 to which is bolted an adjusting lever 24 carrying a spring loaded latch rod 25 provided at its outer end with a handle or grip 26 which is arranged adjacent a handle 27 located at the outer end of the adjusting lever 24. The spring loaded latch rod 25 is arranged to engage holes 28 in a segment 29 mounted on the hood and located adjacent to the coupling sleeve 18, as clearly illustrated in Fig. 1 of the drawings. The segment 29 is arranged at an inclination and its lower front end is welded or otherwise secured to the hood and its upper rear end is supported by a brace or bar 30 in fixed connection at its upper end with the segment and welded or otherwise secured at its lower end to the hood. When the lever 24 is moved upwardly or downwardly the crank axle is partially rotated and its crank arms 31 are oscillated with respect to the hood. The spindles of the crank axle act as a pivot in the adjustment of the crank axle and when the lever is raised the hood is raised and when the lever is lowered the hood is lowered. A simple adjustment of the height of the machine from the ground is thus provided by the lever and the crank axle and by this means the cutting hammers 32 consisting of elongated plates of stiff metal may be raised or lowered and positioned properly with relation to the ground.

Coil springs 33 are located at the ends of the hood and are connected with the axle and the hood to counterbalance the weight of the machine and thereby reduce the effort required for adjustment of the machine. The axle is provided adjacent the crank arms 31 with upwardly extending arms 34 welded or otherwise secured to the axle and provided at their upper ends with perforations 35 in which are secured the front ends of the springs 33, which front ends are preferably bent into the form of hooks or loops 36. The rear ends of the springs 33 are bent to form loops 37 which are engaged with hook bolts 38 mounted in openings of arms or brackets 39 and secured in adjusted positions by nuts 40. The hook bolts may be adjusted to vary the tension of the springs.

The power take-off assembly 11 is connected by a universal joint 41 with an input shaft 42 which is journaled at its front and rear portions in bearings 43 and 44 mounted in a tubular section 45 of a housing unit comprising the said tubular section 45 and a cylindrical section 46 fixedly connected with a circular wall or disc 47 of the tubular section at its front end and closed and sealed at its rear end by a plate 48. The plate 48 may be secured to the cylindrical section 47 of the housing unit by any suitable means and is designed in practice to be removable to afford access to the interior of the housing unit. The shaft 42 which is arranged at a slight inclination is splined or otherwise secured in a rearwardly projecting sleeve 49 of the universal joint 41 of the power take-off assembly 11 and the front bearing 43 is adjustable by means of a threaded sleeve or nut 50 engaging a threaded portion of the shaft 42 and located at the front end of the tubular member 45 of the housing assembly.

The rear end of the shaft 42 extends into the cylindrical section 46 of the housing assembly and it has splined or otherwise secured to it a bevel gear 51 which meshes with a bevel pinion 52, the ratio of the pinion and the bevel gear being such that the pinion turns at a speed necessary for proper shredding or pulverizing action. The bevel pinion 52 is supported on or splined to a transversely disposed out-put shaft 53. The pinion 52 is provided with a hub 54 which extends beyond one end of the transversely disposed input shaft 55 and has splined or otherwise keyed to it the inner end 56 of a hammer cylinder shaft 57. A pair of transversely aligned hammer cylinder shafts 57 and 58 is employed and the inner end 59 of the hammer cylinder shaft 58 is arranged within and splined or keyed to a coupling sleeve 60 which is fixedly secured to the adjacent end of the transverse input shaft 55. The coupling sleeve 60, which enables the rotary motion of the shaft 55 to be transmitted to the shaft 58, is provided with a cone surface 61 which forms a support for the bevel gear at a point diametrically opposite the point where the bevel gear 51 meshes with the pinion 52. The cylindrical section 46 of the housing assembly is provided at opposite sides with bearings 62 and 63 in which the hub 54 of pinion 52 and the coupling sleeve 60 are journaled. The bevel gear may be retained on the rear end of the shaft 42 by a ring 64 suitably secured to the shaft 42, but any other suitable means may, of course, be employed for this purpose.

The housing assembly is firmly supported within a center frame by being bolted or otherwise secured thereto and this provides a central support for both hammer cylinder assemblies and the gear drive mechanism. The center frame is disposed longitudinally of the machine and composed of spaced sides 65 and a rear transverse connecting portion 66 welded or otherwise secured to the hood. The sides of the center frame extend through the hood and form the tongue 3 which is provided intermediate its ends with a connecting crosspiece 67 and at its front end with a connecting portion 68 through which the bar 6 passes. The tongue is provided exteriorly of the hood with integral brackets 69 through which the sections of the crank axle pass, as clearly illustrated in Fig. 1 of the drawings.

Figure 4:
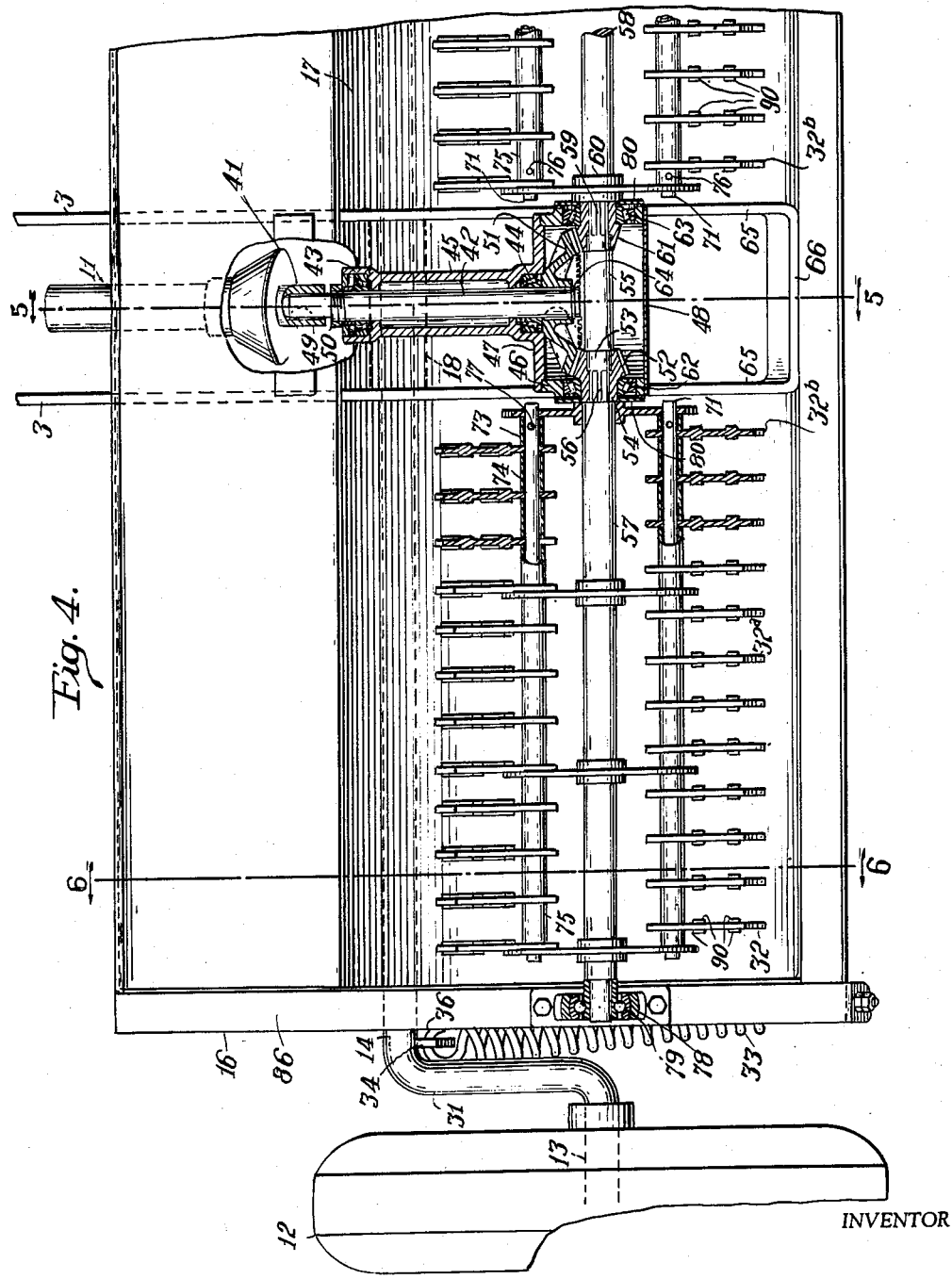
Fig. 4 is a bottom plan view on an enlarged scale of the major portion of the stalk cutter and shredder.

The hammer cylinders or cylindrical structures which carry the hammers or elongated plates 32, 32a and 32b, are disposed transversely of the machine in alignment, as clearly illustrated in Fig. 4 of the drawings, and they are spaced apart at the center of the machine to provide an intervening space for the housing assembly and the gearing contained therein and each is composed of a shaft 57 or 58 and four circular steel plates 70 welded or otherwise secured to the shaft. Each of the circular plates or discs 70 is provided with three holes uniformly spaced about its periphery for the reception of hammer pivot rods 71. The hammers 32, 32a and 32b are each provided with a hole 72 through which a pivot rod 71 passes. The hammers are held axially in spaced relation on the pivot rods by spacers 73, 74 and 75, consisting of sleeves interposed between the hammers. One spacer on each rod is welded to an end plate and is provided with a hole 76. A corresponding hole 77 is provided in each hammer rod and a cotter pin or other suitable fastening device is employed to hold the rod in place in the cylinder assembly. The outer end of the cylinder assembly is supported by a bearing block 78 in which the outer end of the cylinder assembly shaft is journaled. The bearing blocks 78 are provided with bearings 79 and the bearings 62 and 63 at the inner ends of the shafts 57 and 58 are adjusted by means of screw caps 80 and shims interposed between the caps and the cylindrical section of the housing assembly. The inner ends of the hammer cylinders are supported by the gear housing assembly and as the inner ends of the cylinder shafts have a splined connection with the centrally arranged, transversely disposed high speed shaft 55, the hammer cylinders are firmly held to and supported from the stalk cutter hood which constitutes the main frame of the machine.

Figure 5:
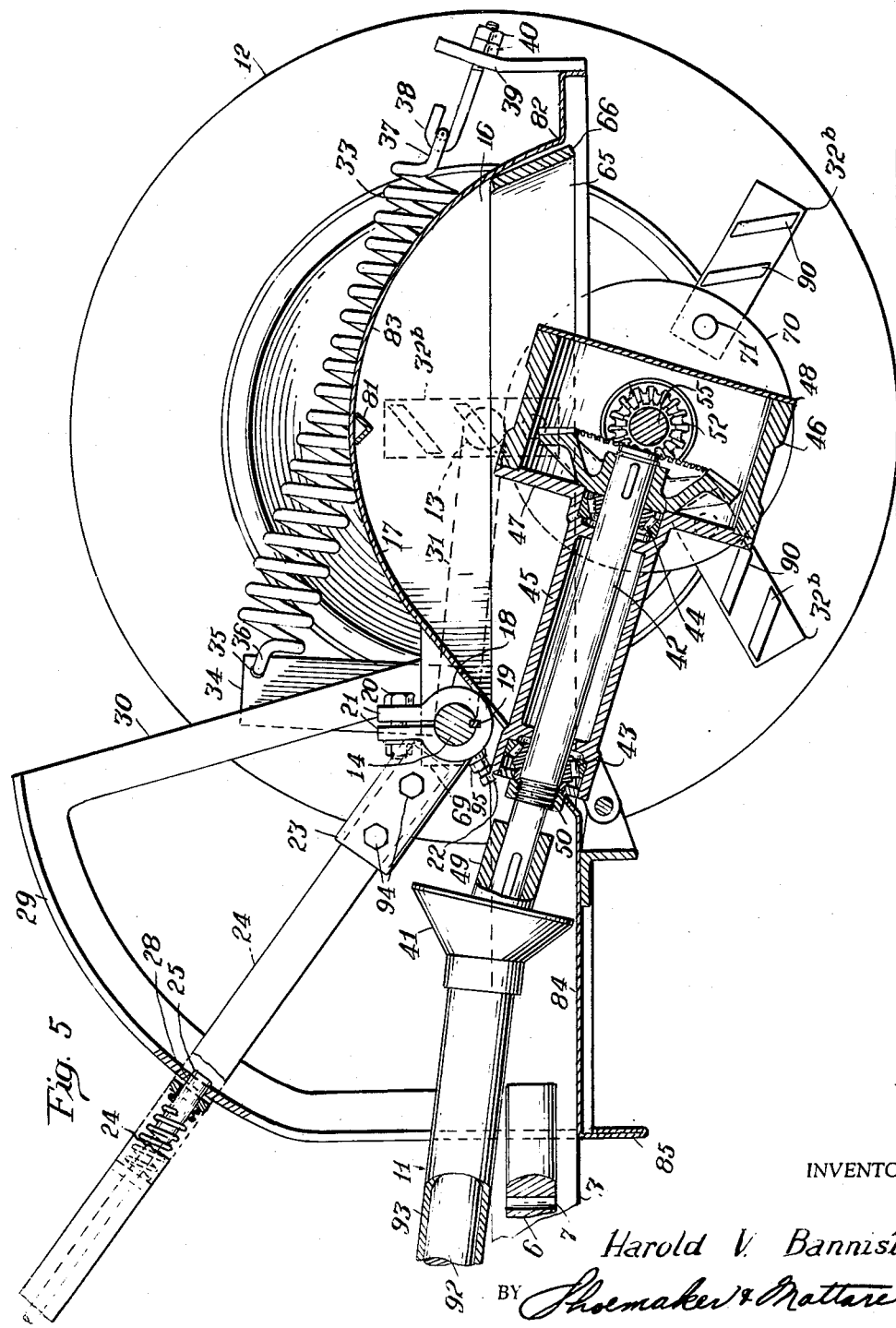
Fig. 5 is a vertical longitudinal sectional view taken on the line 5—5 of Fig. 4.

When the hammer cylinder assemblies are rotated at high speed the hammers are forced to stand out in a radial position with respect to the cylinder shaft by centrifugal force. In their extended position the hammers just clear the hood 17 and a fixed cutter bar 81 mounted on the hood interiorly thereof and cooperating with the hammers in their pulverizing and shredding action. The fixed cutter bar 81 which extends transversely of the machine, is located above the hammer cylinders in parallelism with the same and the cutter bar is preferably tapered transversely, as clearly illustrated in Figs. 5 and 6 of the drawings. The clearance between the hammers and the cutter bar is slight so that only extremely small pieces of stalks or other vegetation are permitted to pass from the front portion of the hood to the rear portion thereof where they are discharged and scattered over the ground.

The hood 17 which constitutes the main frame of the machine is composed of a main section 82 and the end plates 16 and this structure affords the necessary strength and rigidity required to withstand the severe shock blows imposed in stalk cutting service. The hood has an arcuate rear portion 83 which is concentric with the hammer cylinders and a substantially flat front portion 84 which is provided at the front with a depending shield 85. The main section of the hood consists of a single sheet of metal rolled and bent to provide the arcuate rear portion and the flat front portion. No dies or special press equipment are required. The end plates 16 are securely welded to the ends of the main section or body portion of the hood so as to form a rigid girder-like structure exceedingly resistant to deflection or distortion. In this assembly of end plates and hood is inserted the center frame assembly which provides means for supporting the front of the stalk cutter and within which is held the gear housing assembly. It will be evident from the position of the axle 14 that all vertical loads resulting from the weight of the machine are taken approximately at the center of mass or gravity of the stalk cutter and shredder. The end plates are bent at right angles to provide flanges 86 on which are mounted the bearing blocks 78. This eliminates building a separate support for the bearing blocks and simplifies the construction of the framework.

Pieces of stalks are picked up by the hammers and lifted into the hood at the front thereof, since the hammers are moving forwardly and near the ground surface, as shown by the arrow in Fig. 6 of the drawings. If the pieces are medium to large in size they will either be pulverized and pass on around the hood to be ejected onto the ground at the rear, or if not pulverized finely enough to pass the cutter bar 81, will be thrown forward again and caught between succeeding rows of hammers until thoroughly pulverized. The hood 17 is extended forwardly and is provided at the front with the depending shield to protect the tractor operator from flying rocks, etc. and to provide for better recirculation of large stalks.

Since the hammers are pivoted on the rods, any large objects such as rocks will cause them to deflect, thus reducing the shock on the stalk cutter mechanism and danger to the operator. It will be noted that the hammers are arranged so that long ones 32 are on the outside of each hammer cylinder while the medium length ones 32a are placed on each side of the center ones 32b, which are of the shortest length. This is done to prevent the hammers digging into the ground since most row crops have the earth piled up in the center of the row where planting has been done. Three lengths of spacers are used so that the hammers on each rod are laterally offset from those of the other two rods on that hammer cylinder, as shown in Fig. 6. This effectively staggers the cutting hammers and results in the most complete coverage of the pulverizing area.

In order to prevent vegetation from winding around the ends of the hammer cylinders and interfering with the rotation of the same, the hood is provided with approximately U-shaped guards 87 depending from the flanges 86 of the end plates 16 and bolted to the same, as clearly illustrated in Fig. 11 of the drawings. Each guard 87 preferably consists of a metal strap provided at its ends with approximately L-shaped brackets 88 fitted against the lower face of the flange 86 and pierced by bolts 89 which also extend through said flange 86. Any other suitable means may, however, be provided for securing the guards to the end plates of the hood. In order to increase the effectiveness of the cutting action of the hammers 32, 32a and 32b, they are preferably provided at one or both faces with rectangular ribs 90 disposed diagonally with relation to the hammers which are substantially oblong. The ribs 90 are arranged in parallelism and present cutting edges to the vegetation and increase the pulverizing action of the hammers. The hammers operate on a hammer mill principle at cyclone speed, the hammer cylinders being rotated at 1450 R. P. M. The hammers completely shred all vegetation level with the ground and operate equally as well on frozen ground as on ordinary soil with no broken blades. The dust and chaff are forced directly into the ground instead of into the air and the thorough shredding and pulverizing of the stalks and other vegetation results in a maximum killing of corn borers and other insects. As the hammers rotate in opposite direction to the tires, stalks and other vegetation are picked up from the ground and with the cooperation of the fixed cutter bar the hammers completely shred and practically pulverize vegetation of every character and leave the ground operated on smooth and easy for plowing.

The power take-off assembly 11, which may be of any desired construction, preferably consists of two telescoping tubular members 92 and 93 which form a shaft and which provide for varying the length of the same, and after a proper length of shaft is attained the two tubular members may be secured in fixed relation to each other by any suitable means.

The shield 85 not only protects the operator of the tractor from stones and other hard objects but is also vertically adjustable with the hammers for varying terrain contours.

The fastening devices 94 for securing the lever 24 to the arm or lug 23 of the coupling sleeve 18 are designed to consist of cap screws or bolts provided with nuts and locking washers and the fastening devices 20 for connecting the split portions of the coupling sleeve 18 are also designed to consist of cap screws or bolts provided with nuts and locking washers. The clamping or set screws 22 which hold the sections of the axle against axial displacement are equipped with lock nuts 95.

What is claimed is:

1. A stalk cutter and shredder comprising a crank axle, a hood mounted on the crank axle and provided with a forwardly projecting tongue adapted for connection with the draw bar of a tractor, a pair of transversely disposed hammer cylinders disposed under the hood and spaced from each other at the center thereof and comprising horizontal shafts rotatably supported by the hood, series of pivoted hammers arranged to extend radially in response to centrifugal force when rotated, mounting means for the hammers carried by the shafts and turning therewith, gearing located between inner ends of the spaced hammer cylinders and connected with said shafts, means for connecting the gearing with the power take-off of the tractor including a central longitudinal shaft extending forwardly from the hood and having its vertical axis located in substantially the same plane as the vertical axis of the tongue, adjusting means connected with the hood and with the axle for partially rotating the cranks with respect to the hood and thereby raising and lowering the hood to vertically adjust the position of the hammers with respect to the ground, arms extending upwardly from the axle, brackets extending upwardly from the rear portion of the hood, and springs extending between and connected with the arms and with the hood for counterbalancing the hood in the adjustment of the crank axle.

2. A stalk cutter and shredder comprising a frame, supporting wheels for said frame, a shaft rotatably mounted transversely of said frame, a plurality of hammers consisting of stiff plates spaced from each other longitudinally and circumferentially of the shaft and having confronting side faces, said plates being pivotally mounted for movement to an extended position radially of the shaft by centrifugal force created during rotation of the shaft, and ribs extending diagonally across the confronting side faces of said plates transversely thereof and spaced from each other longitudinally of the plates.

3. A stalk cutter and shredder comprising a frame adapted to be hitched back of a tractor and drawn forward thereby, a shaft rotatably mounted transversely of said frame, discs rigidly mounted about the shaft in spaced relation to each other and turning with said shaft, rods carried by said discs in spaced parallel relation to said shaft and spaced from each other circumferentially of the discs, hammers consisting of elongated stiff plates spaced from each other longitudinally of said rods and having confronting side faces, inner ends of said plates being pivotally mounted about the rods for swinging movement about the rods outwardly to an extended position in which they extend radially of both the rods and the shaft by action of centrifugal force created during rotation of the shaft, and ribs spaced from each other longitudinally of the plates and extending across opposite side faces of the plates transversely thereof and projecting laterally from the said side faces of the plates.

4. A stalk cutter and shredder comprising a frame adapted to be hitched back of a tractor, a hood mounted transversely of said frame and having a dome-shaped wall, a shaft rotatably mounted under said hood transversely of said frame, rods, supports for said rods rigidly carried by and turning with said shaft and holding the rods spaced from each other circumferentially of the shaft and in spaced parallel relation to the shaft, hammers consisting of stiff metal plates spaced from each other longitudinally of the rods and having confronting side faces, said plates being pivoted at inner ends to said rods and movable about the rods to an extended position by centrifugal force created when the shaft is rotating, ribs upon the confronting side faces of said plates, and a cutter bar in said hood mounted against the wall and extending transversely of the frame, the cutting bar being V-shaped in cross section and having converging side faces intersecting adjacent the path of travel of outer ends of the extended hammers.

5. A stalk cutter and shredder comprising a frame, an axle rockably mounted across said frame and having arms and spindles projecting from the arms, supporting wheels upon said spindles, a hood mounted upon said frame and projecting from opposite sides thereof and having a front portion extending forwardly under the axle and at opposite sides having upstanding flanges through which portions of the axle rotatably pass, arms extending upwardly from said axle in outwardly spaced relation to opposite sides of the hood, brackets extending upwardly from rear ends of opposite sides of said hood, springs at opposite sides of said hood having rear ends connected with said brackets and at their front ends being connected with the arms projecting upwardly from the axle, an adjusting lever rigidly carried by and extending forwardly from said axle intermediate the width of the frame, a rack extending upwardly from said hood in outwardly spaced relation to a side of the frame and engageable by said lever to releasably hold the lever and the axle in adjusted positions and maintain the frame and the hood a desired distance above the ground, a shaft extending transversely of said frame under said hood and rotatably supported by the hood and the frame, hammer mechanism carried by and turning with said shaft, and means operatively associated with the shaft for rotating said shaft.

HAROLD V. BANNISTER.

REFERENCES CITED

The following references are of record in the file of this patent:

UNITED STATES PATENTS

| Number | Name | Date |
| --- | --- | --- |
| Re. 12,659 | Williams | June 4, 1907 |
| 1,893,871 | Romera | Jan. 10, 1933 |
| 2,250,103 | Locke et al. | July 22, 1941 |
| 2,500,914 | Sells et al. | Mar. 14, 1950 |
| 2,505,089 | Bailey et al. | Apr. 25, 1950 |
| 2,527,974 | Tostenrud et al. | Oct. 31, 1950 |
| 2,529,358 | Slater | Nov. 7, 1950 |
| 2,531,732 | Hoffman | Nov. 28, 1950 |
| 2,556,446 | Roach | June 12, 1951 |